(12) United States Patent
Kimura et al.

(10) Patent No.: US 7,195,148 B2
(45) Date of Patent: Mar. 27, 2007

(54) CARD PRINTER IN A CARD INFORMATION MANAGEMENT SYSTEM

(75) Inventors: Tetsuya Kimura, Kanagawa (JP);
Mario Fuse, Kanagawa (JP); Shoji Yamaguchi, Kanagawa (JP); Hideki Fukunaga, Kanagawa (JP); Hideaki Ashikaga, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 216 days.

(21) Appl. No.: 10/237,726

(22) Filed: Sep. 10, 2002

(65) Prior Publication Data

US 2003/0062409 A1    Apr. 3, 2003

(30) Foreign Application Priority Data

Sep. 19, 2001 (JP) ............... P.2001-284322

(51) Int. Cl.
*G06F 17/00* (2006.01)
(52) U.S. Cl. ............... 235/375; 463/29; 463/47
(58) Field of Classification Search ............... 235/375, 235/380, 381, 382; 704/3; 358/1.14; 705/1; 463/43, 47, 29
See application file for complete search history.

(56) References Cited

U.S. PATENT DOCUMENTS

| | | | | |
|---|---|---|---|---|
| 5,235,519 A | * | 8/1993 | Miura | 700/233 |
| 5,600,362 A | * | 2/1997 | Morgavi et al. | 347/218 |
| 5,783,809 A | * | 7/1998 | Niino et al. | 235/380 |
| 6,362,893 B1 | * | 3/2002 | Francis et al. | 358/1.14 |
| 6,468,162 B1 | * | 10/2002 | Nakamura | 463/43 |
| 6,473,728 B1 | * | 10/2002 | Tognazzini | 704/3 |
| 6,616,535 B1 | * | 9/2003 | Nishizaki et al. | 463/43 |
| 6,780,113 B2 | * | 8/2004 | Nojiri et al. | 463/47 |
| 6,835,135 B1 | * | 12/2004 | Silverbrook et al. | 463/30 |
| 6,842,533 B1 | * | 1/2005 | Patton et al. | 382/115 |
| 6,852,033 B2 | * | 2/2005 | Kinjo et al. | 463/30 |

\* cited by examiner

*Primary Examiner*—Daniel Stcyr
*Assistant Examiner*—Jamara A. Franklin
(74) *Attorney, Agent, or Firm*—Morgan, Lewis & Bockius LLP

(57) ABSTRACT

A card printer in a card information management system. The card printer has a data input part for inputting data acquired by a user. The data is character information of a character generated by a program stored in a predetermined apparatus according to predetermined operations of a user. The card printer has a user ID input part for inputting an ID of the user. The data inputted from the data input part is converted into print information by a print information generation part. Approval information of the supplier of the card is generated by an approval information generation part. This print information and the approval information are printed on a card by a print part through an image processing part and a print control part. The user can obtain the card to which the approval information is added on demand.

20 Claims, 4 Drawing Sheets

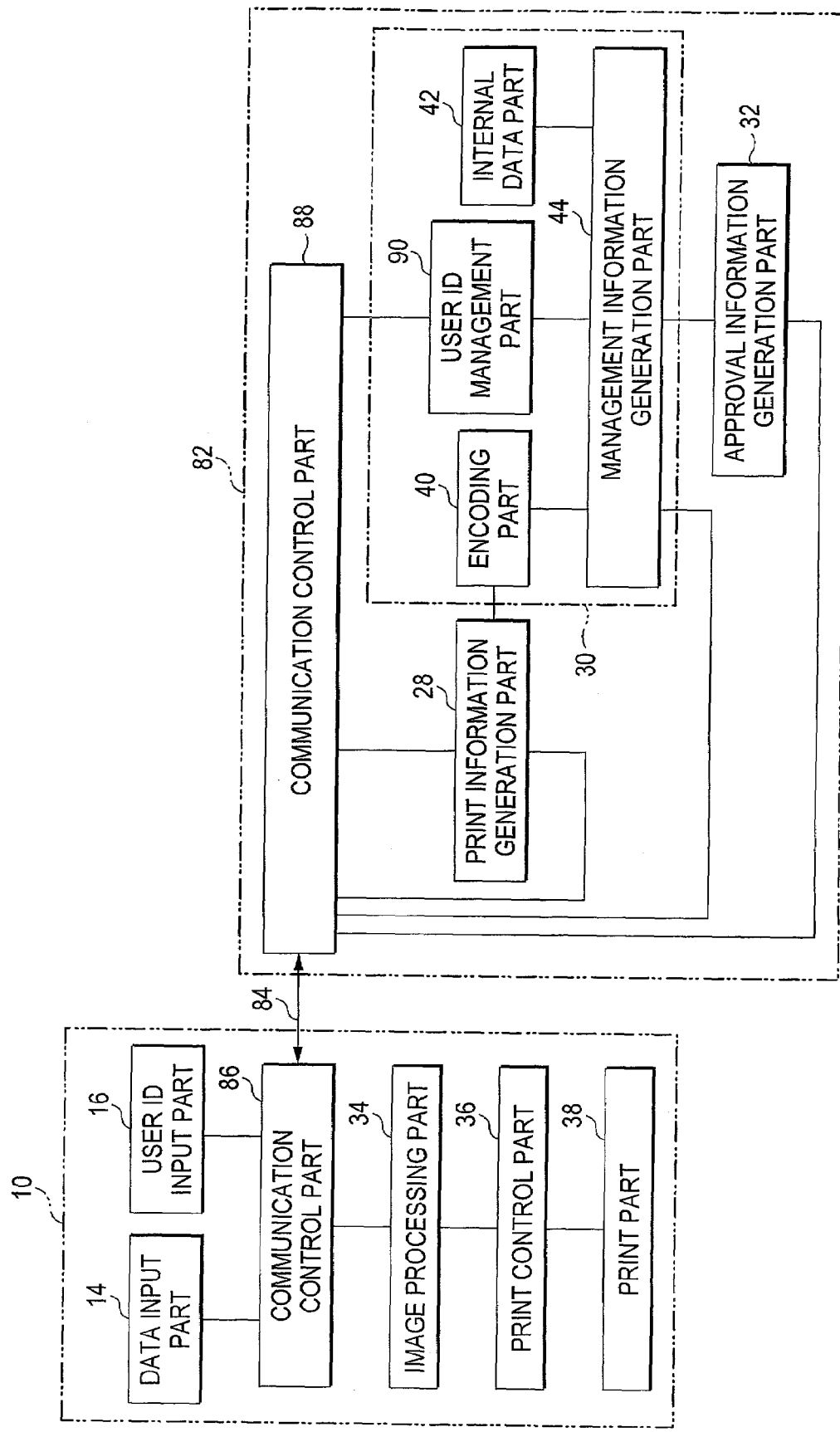

CARD PRINTER IN A CARD INFORMATION MANAGEMENT SYSTEM

BACKGROUND OF THE INVENTION

1. Field of the Invention

This invention relates to a card printer for printing a card according to data which a user acquires by a simulation or a game, a card information management apparatus for managing information printed in this card printer, and a card print information management system for printing a card and managing information.

2. Background Art

Trading cards on which famous names, sport players, entertainers, heroes of comics or games, or characters of animals are printed have been sold for the purpose of collection. These cards have been sold in a state in which plural cards are used as one set and are packed so that the contents of the cards are not known. As a result of that, there is a problem that many people continue purchase until a desired card can be obtained and gambling spirit is stirred up uselessly.

Also, with respect to a card used in a card game, a characteristic value of a character printed on the card becomes an important element and in the case of a meeting using a card, a player having many cards of a character with a high characteristic value becomes advantageous, but in order to obtain the card of the character with the high characteristic value, a probability of obtaining the card of the character with the high characteristic value is increased by purchasing many cards or the card of the character with the high characteristic value is designated to pay a high price and there is a problem that fairness is lacking in win and loss of the card game.

Further, trading cards are printed in editions, so that many cards of the same type are present and there is a problem that an individual original card is not present. Also, in the card used in the card game, a character and a characteristic value about its character are limited.

On the other hand, a game in which a player increases a characteristic value of a character while advancing a story programmed previously has been commercially available as a computer game, but there is a problem that the character and its characteristic value increased by advancing the game are not reflected on a card for card game.

Also, a game for changing a characteristic value of a character by a command which a player selects or inputs according to a situation of the game, or a robot in which a behavior form changes by giving a stimulus of voice or pressure as a pet-like use has been commercially available, but a card for indicating a stage of deciding an advance condition of the characteristic value of the character or the behavior form of the pet robot is not present.

Also, in the case of attempting to print a card, a system for proving that the card is officially authorized to an official organization such as a maker and is not a counterfeit card has not been established.

SUMMARY OF THE INVENTION

An object of the invention is to provide a card printer in a card print information management system in which an original card of an individual user with approval information having fairness and amusement can be printed according to data acquired by a user and in which waste of the user is reduced.

In order to achieve the problem, a first feature of the invention resides in a card printer comprising data input means for inputting data acquired by a user, approval information input means for inputting approval information, and print means for printing print information based on data inputted by the data input means and approval information inputted from the approval information input means on a card. As a result of this, when a user inputs data acquired for oneself from the data input means, a card on which print information formed from this data and approval information inputted from the approval information input means are printed by the print means can be obtained on demand.

The data acquired by the user is preferably data generated according to user input information and a program previously stored in at least one piece of electronic equipment selected from a game machine for home, a portable game machine, a personal computer and a robot. Also, the print information can include at least one of character information outputted as an image and characteristic value information of a character outputted as a letter. The character means things representing features of the actual substances such as human, animal or plant, or imaginary living things. Also, in the data printer, print information generation means for generating the print information based on data inputted by the data input means can be provided. The inputted data is encoded by this print information generation means and a desirable character image can be formed.

Also, in the data printer, management means for managing the print information and the approval information printed on the card can be provided. The management means includes user ID input means, and a user can be identified by a user ID inputted by this user ID input means. Also, this user ID is preferably an ID previously registered in an official organization. A management target of the management means can include user information from the user ID, print information, information about print time and information about a device in which a card is printed, and these can be managed every card.

Incidentally, as the print means, means capable of printing by fine dots to the extent difficult to copy is preferable and, for example, means constructed of a photoconductor and a surface light emitting laser array for forming a latent image in this photoconductor is preferable.

A second feature of the invention resides in a card information management apparatus connected to a card printer through communication means, comprising print information generation means for sending data acquired by a user from the card printer and generating print information based on this data and returning the print information to the card printer, approval information generation means for generating approval information and sending the approval information to the card printer, and management means for managing the print information and the approval information generated by the print information generation means and the approval information generation means. Since this card information management apparatus is connected to the card printer through the communication means, centralized management can be performed. Thus, various management information can be generated from data sent from the card printer and, for example, ranking information about a characteristic value of a character can be generated.

A third feature of the invention resides in a card print information management system comprising data input means for inputting data acquired by a user, print information generation means for generating print information based on data inputted by this data input means, approval information generation means for generating approval information, print means for printing the print information generated by the print information generation means and the approval information generated by the approval information generation means on a card, and management means for managing the print information and the approval information printed by this print means. Based on the data acquired by the user, the card can be printed and also user information can be managed.

A fourth feature of this invention resides in a method for printing on a card, comprising: generating character information of a character by a program stored in a predetermined apparatus, the program generating the character information according to predetermined operations of a user; forming an image based on the character information and an approve information of the supplier of the card; and printing the image on the card.

A fifth feature of this invention resides in a method for printing on a card, comprising: obtaining character information regarding a character; forming an image of the character based on the character information and an image expressing approve information of the supplier of the card; and printing the images on the card.

BRIEF DESCRIPTION OF THE DRAWINGS

FIG. 6 is a block diagram showing the card print information management system according to the third embodiment of the invention.

DETAILED DESCRIPTION OF THE PREFERRED EMBODIMENTS

Next, embodiments of the invention will be described on the basis of the drawings.

Figure 1:
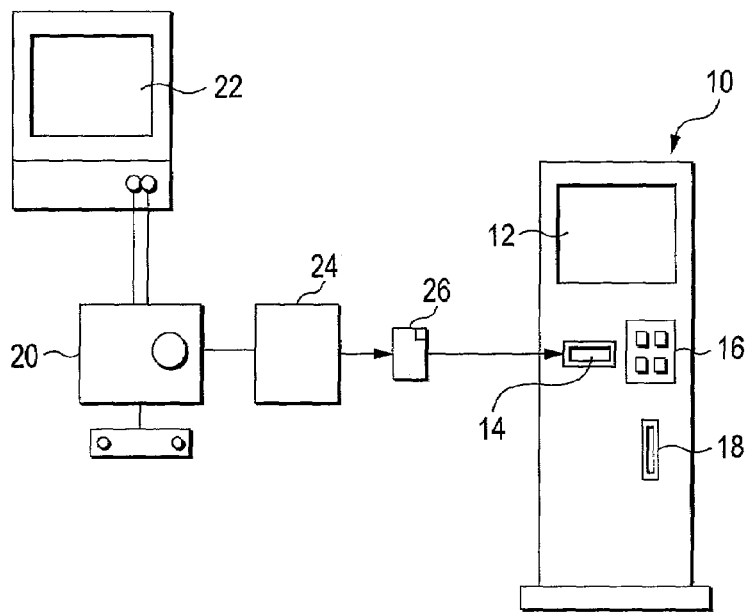
FIG. 1 is a system configuration diagram showing a card printer according to a first embodiment of the invention.

In FIGS. 1 to 4, a first embodiment of the invention is shown. In FIG. 1, a card printer 10 has a display 12 for information display which is installed in, for example, a convenience store or an amusement arcade and displays information, a data input part 14 for inputting data acquired by a user, a user ID input part 16 which is formed of a ten-key pad and inputs a user ID, and an accounting part 18 for inserting a coin.

Electronic equipment 20 is formed of a game machine for home, a portable game machine or a personal computer, and a display 22 for game for displaying the game contents and a storage device 24 for storing data are connected to this electronic equipment 20. A game program in which a characteristic value of a character is increased while advancing a story or the characteristic value of the character changes by a command which a player selects or inputs according to a situation of a game is stored in this electronic equipment 20. Data acquired by a user thus is constructed so as to be recorded on a record medium 26 held in the storage device 24. The storage medium 26 is formed of a floppy disk, a CD, an MD or a DVD. This storage medium 26 is carried to the card printer 10 by the user and is inserted into the data input part 14 of the card printer 10 and data stored in this storage medium 26 is read in the card printer 10.

Figure 2:
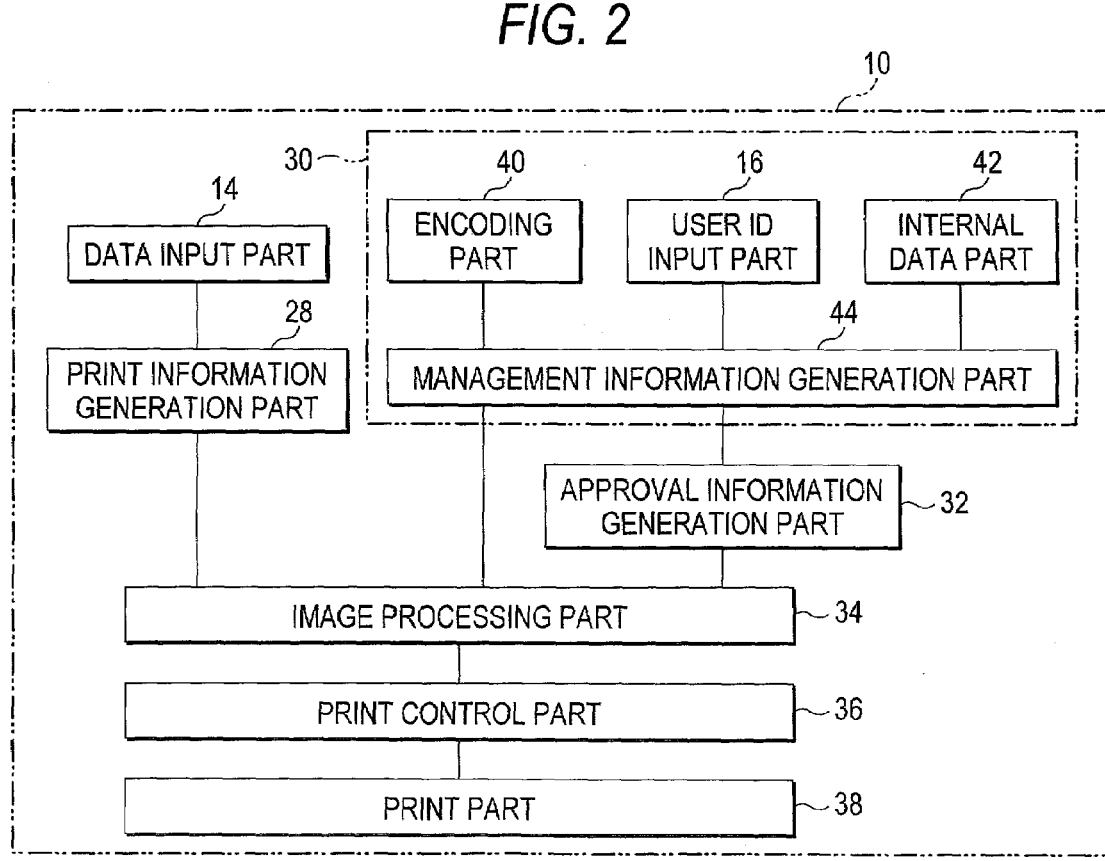
FIG. 2 is a block diagram showing the card printer according to the first embodiment of the invention.

In FIG. 2, a block diagram of the card printer 10 is shown and in addition to the data input part 14 described above, the card printer 10 has a print information generation part 28 for generating information printed on a card according to acquisition data inputted from the data input part 14, a card print information management part 30 for managing the information printed on the card, an approval information generation part 32 for generating information indicating that the card has received approval of an official organization such as a maker, an image processing part 34 for processing an image printed as the card, a print control part 36 for controlling a print part, and a print part 38.

The card print information management part 30, which manages the information printed on the card, comprises the user ID input part 16 described above, an encoding part 40 for converting a part or all of the data acquired by a user generated in the print information generation part 28 into a code, an internal data part 42 for generating a code for identifying the time and date at which the card is printed or a device in which the card is printed, and a management information generation part 44 for generating management information. A user ID previously registered in an official organization such as a maker by a user is inputted to the user ID input part 16. It is constructed so that information for checking or recognizing data input, input of the user ID and processing of a card print image in a card print process is displayed on the display 12 for information display described above. Also, the accounting part 18 is constructed so that a substantial operation of the card printer 10 can be started by inserting a coin.

Figure 3:
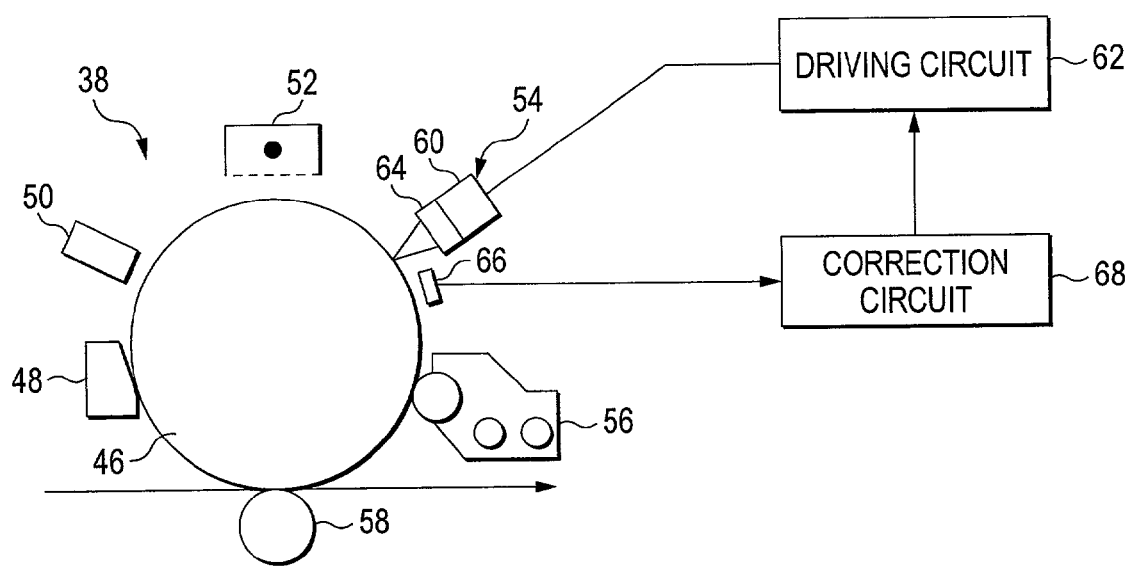
FIG. 3 is a side view showing a print part used in the card printer according to the first embodiment of the invention.

In FIG. 3, a concrete example of the print part 38 is shown. The print part 38 is formed of, for example, a xerography engine, and has a photoconductor 46 and in the periphery of this photoconductor 46, a cleaner 48, an electrostatic eliminator 50, an electrification device 52, an exposure device 54, a developing device 56 and a transfer roll 58 are placed in a clockwise direction. In the photoconductor 46, static electricity is eliminated by the electrostatic eliminator 50 and the whole is electrified by the electrification device 52 and a latent image corresponding to image data is formed by the exposure device 54 and is developed by the developing device 56. Toner developed by this developing device 56 is transferred to a card passing between the photoconductor 46 and the transfer roll 58 by the transfer roll 58 and is fixed in the card by a fixing device (not shown). The toner left on the photoconductor 46 is eliminated by the cleaner 48.

The exposure device 54 has a laser array 60 in which plural surface light emitting laser elements are placed two-dimensionally as a light source, a driving circuit 62 for driving this laser array, an optical system 64 for forming a light emitting pattern of the laser array 60 by a desired magnification, a light amount sensor 66 for detecting light amounts of the individual surface light emitting laser elements of the laser array 60, and a correction circuit 68 for feeding back a light amount correction signal to the driving circuit 62 so as to control driving current, voltage or pulse width of each the surface light emitting laser element according to output of this light amount sensor 66. The laser array 60 and the optical system 64 are constructed so that a dot of 21 µm or more and less than 127 µm can be formed and a spot of a laser beam from the surface light emitting laser array elements formed on the photoconductor 46 is set to a minute spot of 21 µm or more and less than 127 µm by setting brightness and magnification of the optical system 64 to proper values and also exact position accuracy can be maintained since a spot position of the laser beam is fixed.

Next, the operation of the first embodiment constructed as above will be described with reference to FIG. 4.

First, a user starts a game program in which the user increases a characteristic value of a character while advancing a story programmed previously or the characteristic value of the character changes by a command which a player selects or inputs according to a situation of a game using the electronic equipment 20 which is a game machine for home, a portable game machine or a personal computer, and stores game information generated by an information processing part of the electronic equipment 20 according to the game program and input information of the user in the given storage medium 26.

Next, when the record medium 26 is inserted into the data input part 14 of the card printer 10, the game information recorded is sent to the print information generation part 28. In the print information generation part 28, information printed on a card is generated based on the game information recorded. Here, the information printed on the card includes image information such as a character image and letter information such as a title or a characteristic value. As shown in FIG. 4, in a card 70, the image in formation is displayed on a character display part 72 and the letter information is respectively printed on a first letter display part 74 for displaying a title etc. and a second letter display part 76 for displaying a characteristic value.

Also, a part or all of the information printed on these cards 70 is encoded by the encoding part 40. In parallel with it, when a user inputs a user ID previously registered in an official organization such as a maker to the user ID input part 16, management information uniquely allocated to the printed card is generated by the management information generation part 44. Information which is encoded by the encoding part 40 to be printed on the card and code information which is generated by the internal data part 42 to identify the time and date at which the card is printed or a device in which the card is printed are also generated by the management information generation part 44. The management information is printed on a management information display part 78 of the card 70 as shown in FIG. 4. Also, in the approval information generation part 32, approval information in which an official organization such as a maker approves that there is a card printed by a legal technique from either or all of a mark approved by the official organization such as a maker and information generated by the management information generation part 44 is generated. This approval information is printed on an approval display part 80 as shown in FIG. 4.

Finally, the image information such as a character image and the letter information such as a title or a characteristic value generated by the print information generation part 28, the management information generated by the management information generation part 44, and the approval information generated by the approval information generation part 32 are transferred to the image processing part 34 and are converted into a card image printed by the image processing part 34 and are printed as the card 70 from the print part 38 by the print control part 36.

Figure 4:
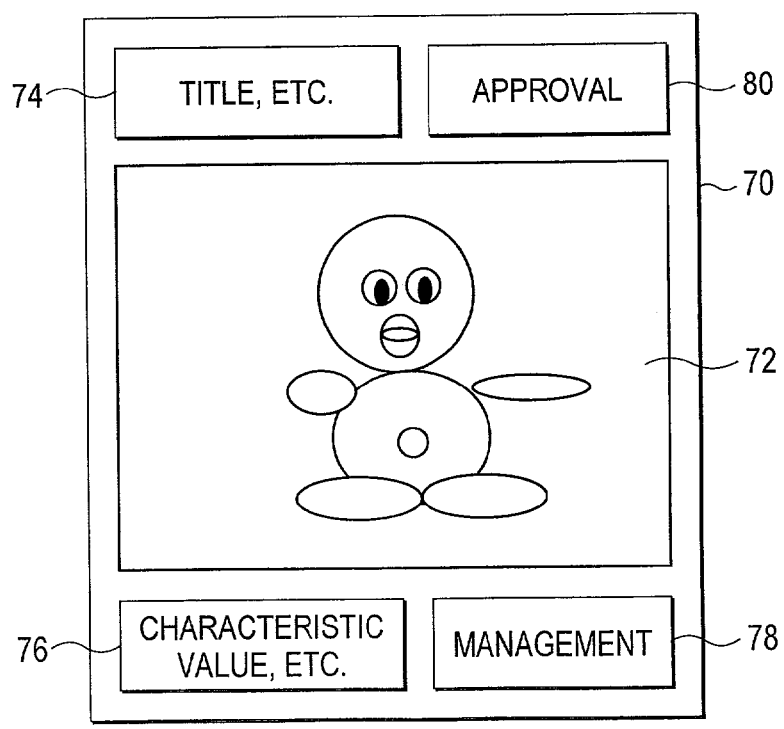
FIG. 4 is a plan view showing a card printed by the card printer according to the first embodiment of the invention.

Incidentally, a layout for displaying the image information such as a character image, the letter information such as a title or a characteristic value, the management information or the approval information in the card 70 or the number of pieces of information is not limited to the example of FIG. 4 and can be set freely.

In the print part 38, in the case of displaying either or both of the management information display part 78 and the approval information display part, when fine letters or lathe works by, for example, a dot of 21 µm or more and less than 127 µm, a copy cannot be made in resolution of a copier and also a counterfeit-resistant card with high security can be printed since it is resolution or less of a general printer. As an exposure method for printing a minute pixel incapable of producing an output by a general printer, there is an exposure method for enlarging and projecting a light emitting pattern of a surface light emitting laser array placed two-dimensionally on a photoconductor as shown in "a driving method of a matrix driving VCSEL array for laser printing" which a writer et al. have reported in Japan Hardcopy 2000, and the exposure method has been described in FIG. 3. According to this method, a minute spot of about 21 µm can be formed as a spot size of a laser beam on the photoconductor 46, so that an exposure image with high resolution can be obtained. Thus, the spot size on the photoconductor 46 is minute and the light amount of each the laser element can be controlled accurately and thereby, exposure amount modulation can be performed and high tone can be produced, so that image information of a character can be printed with high image quality and the management information or the approval information can be printed by fine letters or lathe works with high accuracy.

Next, a second embodiment of the invention will be described.

In a block diagram of a card printer according to the second embodiment of the invention and one example of a card printed by the card printer according to the second embodiment of the invention, FIGS. 2 and 4 are used in a manner similar to the description of the first embodiment of the invention.

First, a user changes a behavior form of a pet robot by giving a stimulus of voice or pressure to the pet robot, and records change information of the behavior form of the pet robot generated in an information processing part of the pet robot on a given record medium. Next, when the record medium is inserted into a data input part 14, the recorded change information of the behavior form of the pet robot is sent to a print information generation part 28.

In the print information generation part 28, information printed on a card is generated based on the recorded change information of the behavior form of the pet robot. Here, the information printed on the card includes image information such as an image of a pet and letter information such as a title or a characteristic value. As shown in FIG. 4, in a card 70, the image information is displayed on a character display part 72 and the letter information is respectively printed on a first letter display part 74 for displaying a title etc. and a second letter display part 76 for displaying a characteristic value.

Also, a part or all of the information printed on these cards is encoded by an encoding part 40. In parallel with it, when a user inputs a user ID previously registered in an official organization such as a maker to a user ID input part 16, management information uniquely allocated to the printed card as well as information which is encoded by the encoding part 40 and is printed on the card, and code information which is generated by an internal data part 42 and identifies the time and date at which the card is printed or a device in which the card is printed are generated by a management information generation part 44. Also, in an approval information generation part 32, approval information in which an official organization such as a maker approves that there is a card printed by a legal technique from either or both of a mark approved by the official organization such as a maker and information generated by the management information generation part 44 is generated.

Finally, the image information such as an image of a pet and the letter information such as a title or a characteristic value generated by the print information generation part 28, the management information generated by the management information generation part 44, and the approval information generated by the approval information generation part 32 are transferred to an image processing part 34 and are converted into a card image printed by the image processing part 34 and the card 70 is printed from a print part 38 by a print control part 36. A layout for displaying the image information such as an image of a pet, the letter information such as a title or a characteristic value, the management information or the approval information in the card 70 or the number of pieces of information is not limited to the example of FIG. 4 and is similar to that of the first embodiment described above.

Next, a third embodiment will be described based on FIGS. 5 and 6.

In the case that this third embodiment is compared with the first and second embodiments described above, while a card printer 10 takes charge of a print function and an information management function in the first and second embodiments, a card printer 10 takes charge of a print function and a card information management device 82 takes charge of an information management function, respectively and it is constructed as a card print management system. That is, the card information management device 82 is constructed as a management server and is connected to plural card printers 10 through communication means 84 such as the Internet, a wireless line or a dedicated line. Incidentally, in this third embodiment, description of the same function portion as that of the first and second embodiments may be omitted by attaching the same number.

The card printer 10 has a data input part 14 for inputting data acquired by a user and a user ID input part 16 for inputting an ID of the user, and the data inputted from this data input part 14 and the user ID inputted from the user ID input part 16 are sent from a first communication control part 86 to a second communication control part 88 provided in the card information management device 82 through the communication means 84.

The card information management device 82 has a print information generation part 28 for generating information printed on a card according to acquisition data inputted through the second communication control part 88, and a card print information management part 30 for managing the information printed on the card. The card print information management part 30 comprises a user ID management part 90 for inputting a user ID through the second communication control part 88, an encoding part 40 for converting a part or all of the data acquired by a user generated in the print information generation part 28 into a code, an internal data part 42 for generating a code for identifying the time and date at which the card is printed or a device in which the card is printed, and a management information generation part 44 for generating management information. The user ID management part 90 decides whether the inputted user ID has been registered newly or has been registered already. The print information generated by the print information generation part 28, the approval information generated by the approval information generation part 32 and the management information generated by the management information generation part 44 are sent to the card printer 10 through the communication means 84 by the second communication control part 88 and are printed on the card through an image processing part 34, a print control part 36 and a print part 38 in the card printer.

In the above-mentioned configuration, first, a user starts a game program in which the user increases a characteristic value of a character while advancing a story programmed previously or the characteristic value of the character changes by a command which a player selects or inputs according to a situation of a game using electronic equipment 20 formed of a game machine for home, a portable game machine or a personal computer, and records game information generated by an information processing part of the electronic equipment 20 according to the game program and input information of the user on a given record medium 26.

Next, when the record medium 26 is inserted into the data input part 14 of the card printer 10, the game information recorded is sent to the print information generation part 28 of the card information management device 82 connected through the communication means 84. In the print information generation part 28, information printed on a card is generated based on the game information recorded. Here, the information printed on the card is image information such as a character image and letter information such as a title or a characteristic value.

A part or all of the information printed on these cards is encoded by the encoding part 40. In parallel with it, when a user inputs a user ID previously registered in an official organization such as a maker to the user ID input part 16 of the card printer 10, the user ID is sent to the user ID management part 90 of the card information management device 82 through the communication means 84 and it is decided whether or not the user ID has been registered officially. Only in the case that the user ID has been registered officially, management information uniquely allocated to the printed card as well as print information which is encoded by the encoding part 40 and is printed on the card, and code information which is generated by the internal data part 42 and identifies the time and date at which the card is printed or a device in which the card is printed are generated by the management information generation part 44. In the approval information generation part 32, approval information in which an official organization such as a maker approves that there is a card printed by a legal technique from either or all of a mark approved by the official organization such as a maker and information generated by the management information generation part 44 is generated.

Finally, the image information such as a character image and the letter information such as a title or a characteristic value generated by the print information generation part 28, the management information generated by the management information generation part 44, and the approval information generated by the approval information generation part 32 are transferred to the image processing part 34 through the communication means 84 and are converted into a card image printed by the image processing part 34 and the card similar to that of FIG. 4 is printed from the print part 38 by the print control part 36.

In the management information generated by the management information generation part 44 of the card information management device 82, ranking of each the characteristic value of data acquired by a user is managed and the user can look at the ranking of each the characteristic value of the data acquired by the user by means of a display 12 for information display.

In addition, a user registers a user ID by the card printer 10 as follows.

First, the user inputs any one of personal information such as a user name, a production number of electronic equipment 20 such as a game machine for home, a portable game machine or a personal computer and a production number of a game program, any combinations of them, or all the information from the user ID input part 16. The inputted information is sent to the user ID management part 90 of the card information management device 82 connected through the communication means 84 and it is decided whether or not the user ID may be registered officially. When the user ID may be registered officially, an official user ID including a password is issued to the user.

Next, a fourth embodiment of the invention will be described.

Figure 5:
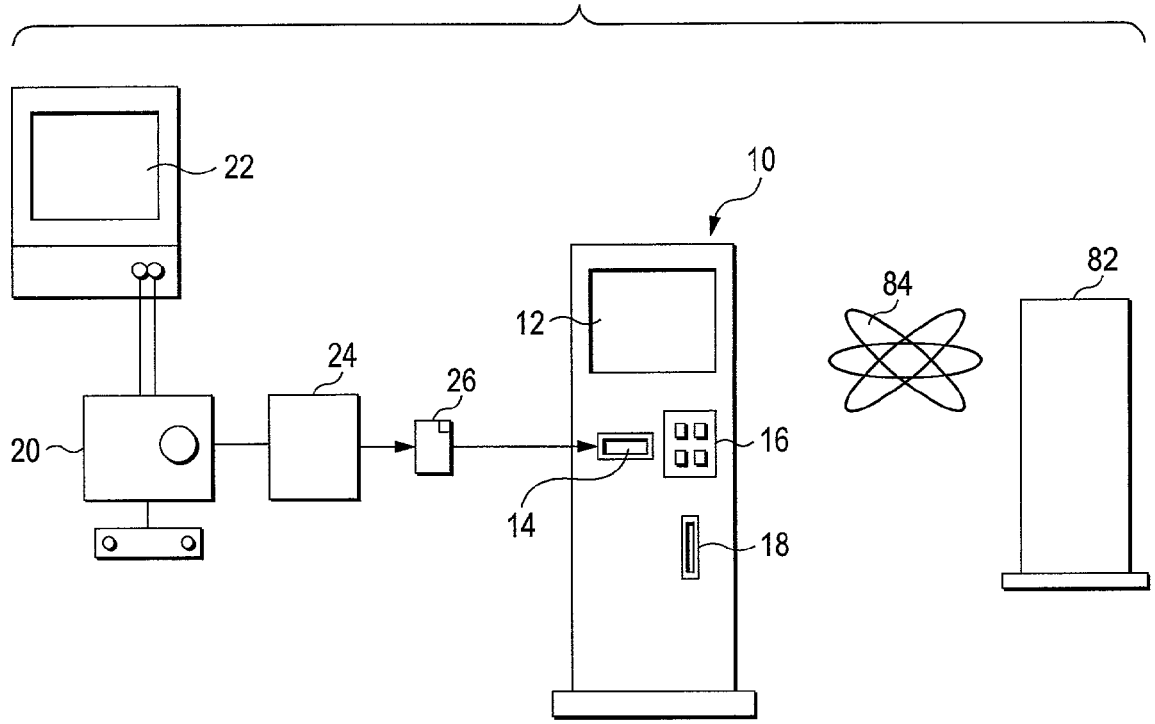
FIG. 5 is a system configuration diagram showing a card print information management system according to a third embodiment of the invention.

In one example of a block diagram of a card information management system according to the fourth embodiment of the invention, FIGS. 5 and 6 are used in a manner similar to the description of the third embodiment of the invention.

First, a user changes a behavior form of a pet robot by giving a stimulus of voice or pressure to the pet robot, and records change information of the behavior form of the pet robot generated in an information processing part of the pet robot on a given record medium 26.

Next, when the record medium 26 is inserted into a data input part 14, the recorded change information of the behavior form of the pet robot is sent to a print information generation part 28 of a card information management device 82 through communication means 84. In the print information generation part 28, information printed on a card is generated based on the recorded change information of the behavior form of the pet robot. Here, the information printed on the card is image information such as an image of a pet and letter information such as a title or a characteristic value.

A part or all of the information printed on these cards is encoded by an encoding part 40. In parallel with it, when a user inputs a user ID previously registered in an official organization such as a maker to a user ID input part 16, the user ID is sent to a user ID management part 90 of the card information management device 82 through the communication means 84 and it is decided whether or not the user ID has been registered officially. Only in the case that the user ID has been registered officially, management information uniquely allocated to the printed card as well as print information which is encoded by the encoding part 40 and is printed on the card, and code information which is generated by an internal data part 42 and identifies the time and date at which the card is printed or a device in which the card is printed are generated by a management information generation part 44. Also, in an approval information generation part 32, approval information in which an official organization such as a maker approves that there is a card printed by a legal technique from either or all of a mark approved by the official organization such as a maker and information generated by the management information generation part 44 is generated.

Finally, the image information such as an image of a pet and the letter information such as a title or a characteristic value generated by the print information generation part 28, the management information generated by the management information generation part 44, and the approval information generated by the approval information generation part 32 are transferred to an image processing part 34 of a card printer 10 and are converted into a card image printed by the image processing part 34 and a card 70 similar to that of FIG. 4 is printed from a print part 38 by a print control part 36. A layout of the image information such as an image of a pet, the letter information such as a title or a characteristic value, the management information and the approval information in the card 70 or the number of pieces of information is not limited to the example of FIG. 4.

In addition, in the management information generated by the management information generation part 44 of the card information management device 82, ranking of each the characteristic value of data acquired by a user is managed and the user can look at the ranking of each the characteristic value of the data acquired by the user by means of a display 12 for information display of the card printer 10.

A user registers a user ID by the card printer 10 as follows.

First, the user inputs any one of personal information such as a user name, a production number of a pet robot and a production number of a program of the pet robot, any combinations of them, or all the information from the user ID input part 16. The inputted information is sent to the user ID management part 90 of the card information management device 82 through the communication means 84 and it is decided whether or not the user ID may be registered officially. When the user ID may be registered officially, an official user ID including a password is issued to the user.

As described above, according to the invention, since an original card of an individual user according to data acquired by the user with approval information can be printed on demand, waste of the user is reduced and fairness and amusement can be improved.

What is claimed is:

1. A card printer comprising:
   data input means for inputting data acquired by a user of an electric apparatus, the electric apparatus being configured with at least one of a game machine for home, a portable game machine, and a robot;
   a user identification input section by which a user identification is input;
   approval information generation means for generating approval information of an official organization, the approval information being associated with the user of the electric apparatus based on the user identification which is input at the user identification input section; and
   a print section for printing print information based on data inputted by the data input means and approval information inputted by the approval information input means on a card associated with the use of the electric apparatus, wherein the approval information confirms the authenticity of the card.

2. The card printer as claimed in claim 1, wherein the data acquired by the user is based on user input information and a program previously stored in the electric apparatus.

3. The card printer as claimed in claim 1, wherein the print information includes at least one of character information to be outputted as an image and characteristic value information of a character to be outputted as an alphanumeric symbol.

4. The card printer as claimed in claim 1, further comprising print information generation means for generating the print information based on the data inputted by the data input means.

5. The card printer as claimed in claim 1, further comprising management means for managing the print information and the approval information to be printed on the card.

6. The card printer as claimed in claim 5, wherein the user identification is previously registered in the official organization.

7. The card printer as claimed in claim 6, wherein the approval information includes a mark of the official organization.

8. The card printer as claimed in claim 5, wherein the management means manages user information identified out of the user identification.

9. The card printer as claimed in claim 5, wherein the management means manages the time information to be printed on the card.

10. The card printer as claimed in claim 5, wherein the management means manages information of the card printer.

11. The card printer as claimed in claim 5 wherein the management means manages the management information so as to be uniquely allocated to each of the cards to be printed.

12. The card printer as claimed in claim 1, wherein the print section comprises a photoconductor and a surface light emitting laser array for forming a latent image in the photoconductor.

13. The card printer as claimed in claim 1, wherein the card is used for a card game.

14. A card information management apparatus to be connected to a card printer through communication means, the apparatus comprising:

print information generation means for generating print information based on data acquired by a user of an electric apparatus, the electric apparatus being configured with at least one of a game machine for home, a portable game machine, and a robot and returning the print information to the card printer;

approval information generation means for generating approval information of an official organization and sending the approval information to the card printer, wherein the approval information confirms the authenticity of a card associated with the use of the electric apparatus and is associated with the user of the electric apparatus; and management means for managing the print information and the approval information generated by the approval information generation means;

wherein the approval information generation means generates the approval information based on a user identification which is input at the user identification input section that is provided at the card printer.

15. The card information management apparatus as claimed in claim 14 wherein the management means manages user information identified out of a user identification transmitted from the card printer.

16. The card information management apparatus as claimed in claim 14, wherein the management means ranks and manages a characteristic value of a character transmitted from the card printer.

17. A card print information management system comprising:

data input means for inputting data acquired by a user of an electric apparatus, the electric apparatus being configured with at least one of a game machine for home, a portable game machine, and a robot;

print information generation means for generating print information based on data inputted by the data input means;

approval information generation means for generating approval information of an official organization, the approval information confirms the authenticity of a card associated with the use of the electric apparatus and is associated with the user of the electric apparatus;

a printer which prints the print information generated by the print information generation means and the approval information generated by the approval information generation means on the card; and management means for managing the print information and the approval information wherein the approval information generation means generates the approval information based on a user identification which is input at the user identification input section that is provided at the card printer.

18. A method for printing on a card, comprising:

generating character information of a character by a program stored in an electric apparatus configured with at least one of a game machine for home, a portable game machine, and a robot, the program generating the character information according to predetermined operations of a user of the electric apparatus;

forming an image based on the character information and approval information of an official supplier of the card, the approval information confirms the authenticity of the card and is associated with the user of the electric apparatus; and printing the image on the card.

19. A method for printing on a card, comprising:

obtaining character information regarding a character using an electric apparatus configured with at least one of a game machine for home, a portable game machine, and a robot;

forming an image of the character based on the character information and an image expressing approval information of an official supplier of the card, the approval information confirms the authenticity of the card and is associated with the user of the electric apparatus; and printing the images on the card.

20. The method for printing on a card as claimed in claim 19, further comprising:

obtaining user identification information;

judging an identity of a user based on the user identification information and registered user information; and generating the approval information according to the identity of the user.

* * * * *